(12) United States Patent
Lau et al.

(10) Patent No.: US 8,304,462 B2
(45) Date of Patent: Nov. 6, 2012

(54) PROCESS FOR MAKING POLYMER COMPOSITES HAVING THERMOPLASTIC PROPERTIES

(75) Inventors: Willie Lau, Lower Gwynedd, PA (US); Rachel Z. Pytel, Ambler, PA (US); Joseph M. Rokowski, Riegelsville, PA (US)

(73) Assignee: Rohm and Haas Company, Philadelphia, PA (US)

(*) Notice: Subject to any disclaimer, the term of this patent is extended or adjusted under 35 U.S.C. 154(b) by 107 days.

(21) Appl. No.: 12/655,287

(22) Filed: Dec. 28, 2009

(65) Prior Publication Data

US 2010/0125108 A1 May 20, 2010

Related U.S. Application Data

(63) Continuation-in-part of application No. 12/459,975, filed on Jul. 10, 2009.

(60) Provisional application No. 61/203,876, filed on Dec. 30, 2008, provisional application No. 61/134,581, filed on Jul. 11, 2008.

(51) Int. Cl.
  *C08J 11/04* (2006.01)

(52) U.S. Cl. .......... 521/45.5; 521/40; 521/40.5; 521/45; 524/68; 524/922; 516/9; 516/98; 516/198; 528/480; 528/499; 528/502 R; 528/502 E; 528/502 F; 428/141; 428/142; 428/144; 428/147; 525/50; 525/55; 525/56; 525/232

(58) Field of Classification Search ............ 521/40, 521/40.5, 41, 43.5, 44, 44.5, 46, 47, 48; 516/9, 516/98, 198; 524/68, 69, 70, 71, 76, 922; 428/141, 142, 144, 147; 525/50, 55, 56, 525/232, 238, 242; 528/480, 499, 502 R, 528/502 D, 502 E, 502 F, 503

See application file for complete search history.

(56) References Cited

U.S. PATENT DOCUMENTS

| 5,710,196 A | 1/1998 | Willard |
| 5,743,471 A * | 4/1998 | Ivanov ............................ 241/16 |
| 5,985,366 A * | 11/1999 | Wright .......................... 427/340 |
| 6,417,251 B1 | 7/2002 | Brady |
| 2006/0074135 A1 | 4/2006 | Shahidi et al. |
| 2006/0151643 A1 | 7/2006 | Tirelli et al. |
| 2007/0173567 A1 | 7/2007 | Ishino |

FOREIGN PATENT DOCUMENTS

| EP | 1 462 482 | 9/2004 |
| EP | 1 640 413 | 3/2006 |
| EP | 2 143 758 | 1/2010 |
| GB | 612509 | 11/1944 |
| GB | 841215 | 7/1960 |
| JP | 11323022 A | 11/1999 |
| JP | 2007283539 A | 11/2007 |
| SU | 694516 | 10/1979 |
| WO | WO 2007/049137 | 5/2007 |

OTHER PUBLICATIONS

Xu, Xi, et al., "Pan Mill Type Equipment Designed for Polymer Stress Reactions" The Institute of Materials, Mar. 20, 1996, pp. 152-158, Chengdu, China.

* cited by examiner

*Primary Examiner* — Frances Tischler
(74) *Attorney, Agent, or Firm* — Andrew E. C. Merriam

(57) ABSTRACT

The present invention provides methods of making composite materials comprising combining particles of crosslinked rubber with one or more aqueous polymer dispersion of a suspension polymer to form a mixture in aqueous dispersion, and, optionally, subjecting the aqueous dispersion mixture to solid state shear pulverization to form materials that can be processed as thermoplastics at crosslinked rubber concentrations of from 10 to as high as 95 wt. %, based on the total solids of the material. The method may further comprise kneading and/or compression molding the pulverized product to form useful articles, such as roofing membranes and shoe soles.

12 Claims, No Drawings

PROCESS FOR MAKING POLYMER COMPOSITES HAVING THERMOPLASTIC PROPERTIES

This application claims the benefit of priority under 35 U.S.C. 119(e) of U.S. Provisional Patent Application Ser. No. 61/203,876 filed on Dec. 30, 2008, and is a Continuation-in Part of U.S. patent application Ser. No. 12/459,975 filed on Jul. 10, 2009, which claims priority to U.S. Provisional Patent Application Ser. No. 61/134,581 filed on Jul. 11, 2008.

The present invention relates to a process for making a flexible composite material from crosslinked rubber and an aqueous suspension polymer dispersion. More particularly, it relates to a process for making a composite that behaves like a thermoplastic from waste rubber vulcanizate and an aqueous suspension polymer dispersion.

As used herein, the term "ground tire rubber" (GTR) refers to a thermoset rubber material in finely ground form, such as crumb rubber, for the purpose of reuse. This material is predominantly comprised of crosslinked rubber from waste tires, but may include other waste rubber from other sources. GTR is supplied commercially in many particle size ranges, with the broadest classes of GTR being generally referred to as "ground rubber" (crumb rubber of 1,520 micron sieve particle size, i.e. 10 mesh, or smaller), and "coarse rubber" (comprising particles of one quarter inch and larger, and with a maximum size of 13,000 mesh sieve particle size (one half inch) in the largest dimension).

As used herein, the term "aqueous polymer dispersion" means a dispersion of polymeric particles in water, which particles exclude the crosslinked rubber particles.

As used herein, the term "suspension polymer" means a polymer made by a suspension polymerization process. The particle sizes of the suspension polymers may be from 1 micron to 10,000 microns, and the polymer particles are often referred to as "beads".

As used herein, the term "latex polymer" refers to a dispersion of polymeric microparticles (particle size<1 micron) in water.

As used herein, the term "emulsion polymer" means a polymer made in water or a substantially aqueous solution by an emulsion polymerization process.

As used herein, the term "pulverization" refers to any process that results in a reduction in the particle size of solid particulate matter, effected by tear, shear, abrasion, or attrition.

As used herein, the term "solid state shear pulverization" or "S³P" refers to a non-melting pulverization of a material in the solid state to impart intense shear stress to the solid particles, and which may be carried out with the material at ambient temperatures or with cooling.

As used herein, the term "forming" refers to an operation that manipulates a thermoplastic material to give a shaped article.

Unless otherwise indicated, any term containing parentheses refers, alternatively, to the whole term as if no parentheses were present and the term without them (i.e. excluding the content of the parentheses), and combinations of each alternative. Thus, the term (co)polymer refers to a homopolymer or copolymer. Further, (meth)acrylic refers to any of acrylic, methacrylic, and mixtures thereof.

As used herein, unless otherwise indicated, the word "copolymer" includes, independently, copolymers, terpolymers, block copolymers, segmented copolymers, graft copolymers, and any mixture or combination thereof.

As used herein, the phrase "alkyl" means any aliphatic alkyl group having one or more carbon atoms, the alkyl group including n-alkyl, s-alkyl, i-alkyl, t-alkyl groups or cyclic aliphatics containing one or more 5, 6 or seven member ring structures.

As used herein, the phrases "($C_3$-$C_{12}$)—" or "($C_3$-$C_6$)—" and the like refer to compounds containing 3 to 12 carbon atoms and 3 to 6 carbon atoms, respectively.

The term "unsaturated carboxylic acid monomers" or "carboxy acid monomers" includes, for example, (meth)acrylic acid, crotonic acid, itaconic acid, 2-methyl itaconic acid, α,β-methylene glutaric acid, monoalkyl fumarates, maleic monomers; anhydrides thereof and mixtures thereof. Maleic monomers include, for example, maleic acid, 2-methyl maleic acid, monoalkyl maleates, and maleic anhydride, and substituted versions thereof.

The term "unsaturated sulfonic acid monomers" includes, for example, 2-(meth)acrylamido-2-methylpropanesulfonic acid and para-styrene sulfonic acid.

As used herein, the phrase "aqueous" or "aqueous solution" includes water and mixtures composed substantially of water and water-miscible solvents.

As used herein, "wt %", "wt. %" or "wt. percent" means weight percent. As used herein, the phrase "based on the total weight of polymer composite solids" refers to weight amounts of any given ingredient in comparison to the total weight amount of all the non-water ingredients in the polymer composite (e.g., suspension copolymers and ground tire rubber).

The singular forms "a," "an," and "the" include plural referents unless the context clearly dictates otherwise. The endpoints of all ranges directed to the same component or property are inclusive of the endpoint and independently combinable.

As used herein, unless otherwise indicated, the term "sieve particle size" refers to the particle size of a material that results from the sample passing through a sieve of the given particle size. For example, ground tire rubber milled so that it passes through a 203 micron sized sieve (60 mesh) is referred to as having a 203 micron sized sieve particle size, or, simply, a 203 micron sieve particle size.

The particle size and particle size distribution of the aqueous polymer dispersions described herein were measured using a Malvern Mastersizer 2000™ Particle Size Analyzer (Malvern Instruments Ltd., Malvern, Worcestershire, UK). This instrument uses a light scattering technique and the particle size obtained is a weight average particle size.

Much effort has been devoted to the reuse of rubber articles, particularly crosslinked or vulcanized rubber. The desire to find new uses for waste motor vehicle tires is particularly acute because they are so numerous, and their disposal presents problems. Waste tires are not readily broken down in landfills, and their disposal by incineration carries with it concerns about atmospheric contamination by particulate emissions and potentially harmful compounds. Waste tires have found limited use, for example, as fuel in cement-making operations; as fillers (when finely ground) in new tires, outdoor athletic surfaces and road asphalt; or as mulch.

Reusing tire rubber as a raw material presents difficulties, particularly when the desired end product is thermoplastic, because it is a crosslinked thermoset composition. For example, extruded articles made from pure ground tire rubber are weak and inflexible because the grains of the ground tire cannot fuse well together as they are a thermoset composition. When ground tire is added to thermoplastic compositions as a filler, there is an upper limit of ground tire content before physical properties are impaired, and this upper limit is approximately 5-10% ground tire rubber. The same is true when ground tire rubber is used in new tires.

There has been substantial effort in recycling or recovering waste tires by mixing with a solid thermoplastic, such as polyethylene, to convert the rubber tire to a material that can be processed. However, this approach requires melt processing of the thermoplastic/rubber mixture at high temperature along with specialized equipment and numerous processing additives. Other known methods include preparing rubber powder with high surface activity from waste tire rubber, which can be used to form polymer/rubber powder composites. Wet techniques of combining ground tire rubber (GTR) and latex copolymers have generally required a coagulation step for the copolymers in order to avoid the mixture separating out.

Although waste rubber tires have received much attention, the problem of recycling rubber remains far more reaching than waste tires. There remains a need for methods to combine thermoset polymers, like crosslinked rubber, with thermoplastic polymers, such that the new composites can be effectively reused as thermoplastic compositions, without loss of mechanical properties of the constituent polymers.

Cold blends (blending at ambient temperature) of aqueous dispersions have also been attempted to combine hard, inelastic copolymeric material with a rubbery copolymeric material. British Patent Publication No. 841,215, to Fendley, discloses thermoplastic molding compositions that utilize hard, inelastic styrene-acrylonitrile-methylmethacrylate copolymers in combination with a rubbery polymer or copolymer of 1,3-butadiene, which rubber may be crosslinked. Such methods, however, fail to meet the need for methods to produce useful flexible thermoplastic materials from recycled thermoset rubber and a thermoplastic polymer, where the materials comprise >10% recycled rubber.

The inventors have endeavored to find a solution to the problem of producing a useful thermoplastic material from recycled thermoset rubber and a thermoplastic polymer that retains the mechanical properties of the constituent polymers even where the proportion of thermoset rubber is >10 wt. % of the composite.

STATEMENT OF THE INVENTION

According to the present invention, methods of making composite materials comprise:

(a) providing, by suspension polymerization, one or more aqueous polymer dispersion of at least one suspension polymer with glass transition temperature, Tg, of no more than 80° C. as measured by differential scanning calorimetry, DSC;

(b) combining particles of one or more crosslinked rubber, having particle size of from about 10 micron sieve particle size to about 11,100 micron sieve particle size, with the aqueous polymer dispersion of suspension polymer to form an aqueous dispersion mixture in aqueous dispersion;

(c) reducing the moisture content of the aqueous dispersion mixture; and (d) forming an article.

The particle size of the crosslinked rubber may be 35 micron sieve particle size (400 mesh) or more, or 2,500 micron sieve particle size (8 mesh) or less.

Preferably, the suspension polymer is an acrylic or styrene-acrylic polymer.

In one embodiment of the invention, the method further comprises subjecting the aqueous dispersion mixture, either before or after reducing the moisture content of the aqueous dispersion mixture, to solid state shear pulverization. In one such embodiment, the particle size of the crosslinked rubber may be 43 micron sieve particle size (325 mesh) or more, or 11,100 micron sieve particle size (2 mesh) or less. The solid state shear pulverization may, for example, comprise pan milling or disk milling.

In another embodiment of the invention, the method further comprises one or more processing step, chosen from kneading the mixture, 2-roll milling the mixture, compression molding the mixture, and extruding the mixture, in forming the article. In one such embodiment, the composite material is further crosslinked during this one or more processing step.

In yet another embodiment, the crosslinked rubber is obtained, at least in part, from recycled rubber, preferably, at least in part, from recycled tires.

In yet still another embodiment, reducing the moisture content of the mixture comprises isolating the solid content of the mixture.

In a different embodiment, the suspension polymer comprises a copolymer having polymerized units of one or more functional monomers with functionality chosen from carboxy acid functionality, phosphorus acid functionality, hydroxy functionality, amine functionality, acetoacetoxy functionality, silyl functionality, epoxy functionality, cyano functionality, isocyanate functionality, and combinations thereof.

In another different embodiment, there is provided methods of making a composite material comprising:

(a) providing, by suspension polymerization, one or more aqueous polymer dispersion of at least one suspension polymer with glass transition temperature, Tg, of no more than 80° C. as measured by differential scanning calorimetry, DSC;

(b) drying the aqueous polymer dispersion of the suspension polymer to produce suspension polymer with moisture content of less than 10%;

(b) combining particles of one or more crosslinked rubber, having particle size of from about 10 micron sieve particle size to about 11,100 micron sieve particle size, with the suspension polymer with moisture content of less than 10%; and (d) forming an article.

This invention provides a method of producing thermoplastic materials from recycled thermoset rubber and thermoplastic polymer, which method comprises combining an aqueous dispersion of a thermoplastic suspension polymer and a thermoset crosslinked rubber under ambient conditions, such that the product can be easily isolated and processed into useful articles.

The inventive method is particularly suitable in the processing of acrylic polymers and crumb rubber tires as the thermoplastic and thermoset polymers, respectively, and can produce useful composite materials comprising >10% , and up to 95% of thermoset rubber. Because colloidally stable latex particles are much smaller than coarse grade GTR (approximately three orders of magnitude different: 150 nm vs. 150 microns), slurries prepared by dispersing GTR with conventional latexes tend to phase separate, with the respective particles unchanged. The suspension polymerization method produces polymer particles with average particle size ranging from about 1 micron to about 1,000 microns, which is in the general size range of the starting rubber particles. Accordingly, the inventive method does not require a coagulation treatment of the polymer either before or after mixing with the thermoset rubber particles. This enables isolation of the product mixture of polymer with crosslinked rubber or GTR, even by conventional methods such as centrifugation and filtering. The latter is not readily achieved using colloidally stable latex polymers.

The crosslinked rubber may be any rubber that has been crosslinked and is not restricted to rubber obtained by grinding waste tires. For example, the crosslinked rubber may have been derived from one or more types of rubber selected from natural rubber, synthetic rubber, and derivatives thereof. Examples of synthetic rubber include diene-based polymers such as isoprene, cis-1,4-polyisoprene, styrene-butadiene, styrene-acrylonitrile-butadiene, acrylonitrile-butadiene, cis-1,4-polybutadiene, ethylene-propylene-diene-monomer rubber (EPDM), chloroprene rubber, halogenated butyl rubber, and the like. The particle size of the crosslinked rubber may range from 35 micron sieve particle size (400 mesh) or more, preferably 43 micron sieve particle size (325 mesh) or more, to a particle size of 7,000 micron sieve particle size (3 mesh) or less, or preferably 2,500 micron sieve particle size (8 mesh) or less. Most preferably, the particle size of the crosslinked rubber is from 75 micron sieve particle size (200 mesh) or more, to 300 micron sieve particle size (46 mesh) or less.

Preferably, the crosslinked rubber of the composite material is a recycled rubber, and most preferably it is obtained, at least in part, from recycled rubber from ground motor vehicle tire polymer. Therefore, the rubber may be vulcanized (crosslinked) or hyperoxidized rubber and may contain one or more species such as crosslinking agent, sulfur, vulcanizing accelerator, antioxidant, ozone degradation inhibitor, preservative, process oil, zinc oxide (ZnO), carbon black, wax, stearic acid, and the like, as are often present in waste rubber products. Preferably, the input rubber has been pre-stripped of any non-rubber content, such as for example, steel belt or cloth, as are often present in waste motor vehicle tires. Commercial sources of GTR are generally provided in this manner.

The present invention is not limited by the shape of the starting crosslinked rubber particles. In one embodiment of the invention, the rubber is used in a wet milling process and undergoes solid-state shear pulverization ($S^3P$) together with the suspension polymer in the form of a slurry. In this embodiment, the rubber may be, for example, in shredded form, rubber pellets, rubber strands, or particles such as crumb rubber, or a rubber powder, which particulate forms are available commercially and produced by methods known to those skilled in the art. Rubber particle sizes as introduced into the $S^3P$ process, although useable, are less practical above 11,100 micron sieve particle size (2 mesh). Generally, the rubber particle size ranges 7,000 micron sieve particle size (3 mesh) or less. The larger particle sizes may require further iterations of wet milling. Additionally, the speed of rotation of and the design of the contact surfaces can also impact the effectiveness of the wet milling. Preferably, the crosslinked rubber for milling has a particle size of 3,350 micron sieve particle size (6 mesh) or less, or 150 micron sieve particle size (80 mesh) or more, or, more preferably, 203 micron sieve particle size (60 mesh) or more. The resulting particle size of the $S^3P$ milled rubber is generally the same size as that of the suspension polymer particles and, for larger starting rubber particle sizes, may range 2000 micron sieve particle size or less. Preferably, the resulting particle size of the $S^3P$ milled rubber is 100 micron sieve particle size or less, or 43 micron sieve particle size (325 mesh) or more, or 35 micron sized sieve particle size (400 mesh) or more. For embodiments that do not employ $S^3P$ processing, the particle size of the rubber is preferably no greater than 2,500 micron sieve particle size (8 mesh).

The suspension (co)polymer used in the composite material may comprise, as copolymerized units, ethylenically unsaturated monomers including, for example, α,β-ethylenically unsaturated monomers (e.g., primary alkenes); vinylaromatic compounds, such as styrene or substituted styrenes (e.g. α-methyl styrene); ethylvinylbenzene, vinylnaphthalene, vinylxylenes, vinyltoluenes, and the like; butadiene; vinyl acetate, vinyl butyrate and other vinyl esters; vinyl monomers such as vinyl alcohol, vinyl ethers, vinyl chloride, vinyl benzophenone, vinylidene chloride, and the like; allyl ethers; N-vinyl pyrrolidinone; olefins; vinyl alkyl ethers with $C_3$-$C_{30}$ alkyl groups (e.g., stearyl vinyl ether); aryl ethers with $C_3$-$C_{30}$ alkyl groups; $C_1$-$C_{30}$ alkyl esters of (meth)acrylic acid (e.g., methyl acrylate, methyl methacrylate, ethyl(meth)acrylate, butyl(meth)acrylate, 2-ethylhexyl(meth)acrylate, benzyl(meth)acrylate, lauryl(meth)acrylate, oleyl(meth)acrylate, palmityl(meth)acrylate, stearyl(meth)acrylate); hydroxyalkyl(meth)acrylate monomers such as 2-hydroxyethyl acrylate, 2-hydroxyethyl methacrylate, 2-hydroxypropyl(meth)acrylate, 2-hydroxybutyl(meth)acrylate, and 1-methyl-2-hydroxyethyl(meth)acrylate; as well as the related amides and nitriles, such as (meth)acrylamide, substituted (meth)acrylamides (e.g., diacetone acrylamide), or N-alkyl substituted (meth)acrylamides (e.g., octyl acrylamide and maleic acid amide); and acrylonitrile or methacrylonitrile; unsaturated vinyl esters of (meth)acrylic acid; multifunctional monomers (e.g., pentaerythritol triacrylate); monomers derived from cholesterol; ethylene; surfactant monomers (e.g., $C_{18}H_{27}$-(ethylene oxide)$_{20}$ methacrylate and $C_{12}H_{25}$-(ethylene oxide)$_{23}$ methacrylate); α,β-monoethylenically unsaturated monomers containing acid functionality (e.g., acrylic acid and methacrylic acid, acryloxypropionic acid, (meth)acryloxypropionic acid, itaconic acid, maleic acid or anhydride, fumaric acid, crotonic acid, monoalkyl maleates, monoalkyl fumarates, monoalkyl itaconates); acid substituted (meth)acrylates; sulfoethyl methacrylate and unsaturated sulfonic acid monomers; acid substituted (meth)acrylamides (e.g., 2-acrylamido-2-methylpropylsulfonic acid); basic substituted (meth)acrylates (e.g., dimethylaminoethyl methacrylate, tertiary-butylaminoethyl methacrylate); and (meth)acrolein.

The suspension (co)polymer of the composite material may further comprise copolymerized functional monomers, or monomers subsequently functionalized, in order to impart preferred properties according to the desired end use of the composite material. Such monomers may include monomers with carboxy acid functionality (for example, ethylenically unsaturated carboxylic acid monomers), or phosphorus acid functionality (phosphorus acid monomers), or monomers with hydroxy functionality, or amine functionality, or acetoacetoxy functionality, or silyl functionality, or epoxy functionality, or cyano functionality, or isocyanate functionality. Examples of functional monomers include (meth) acrylic acid, glycidyl(meth)acrylate, phosphoethyl(meth) acrylate, hydroxyethyl(meth)acrylate, acetoacetoxyethyl (meth)acrylate, and the like. Acrylic polymers are especially well suited to the invention because of the variety of functional groups that can be readily incorporated into the polymer backbone.

In one embodiment, the suspension (co)polymer of this invention comprises one or more copolymerized multi-ethylenically unsaturated monomers such as, for example, allyl methacrylate (ALMA), allyl acrylate, diallyl phthalate, 1,4-butylene glycol dimethacrylate, 1,2-ethylene glycol dimethacrylate, 1,6-hexanediol diacrylate, butadiene, trimethylolpropane triacrylate (TMPTA) and divinyl benzene. The multi-ethylenically unsaturated monomer can be effectively employed at levels as low as 0.1%, by weight based on the weight of the copolymer, preferably from 0.1 to 10%, or 0.1 to 5%, by weight based on the weight of the copolymer.

Suspension (co)polymers that are suitable for use in the present invention include, but are not limited to, all-acrylic polymers; styrene-acrylic polymers; vinyl-acrylic polymers, vinylacetate polymers, vinylacetate-acrylic polymers, ethylene-vinylacetate polymers, ethylene-vinylacetate-vinylchloride polymers, and synthetic rubber, such as isoprenes, butadienes such as styrene-butadiene polymers, and styrene-butadiene-acrylonitrile polymers; and combinations thereof. The molecular weight of such suspension polymer species may be controlled by the use of a chain regulator, for example, sulfur compounds, such as mercaptoethanol and dodecyl mercaptan. The amount of chain regulator, based on the total weight of all monomers used to make the (co)polymer, may range 20% or less, more commonly 7% or less. The molecular weight of the (co)polymer is preferably from about 5,000 to 2,000,000, or, more preferably, from 20,000 and 1,000,000.

The glass transition temperature (Tg) of the polymers is measured by differential scanning calorimetry (DSC). "$T_g$" is the temperature at or above which a glassy polymer will undergo segmental motion of the polymer chain. To measure the glass transition temperature of a polymer by DSC, the polymer sample is dried, preheated to 120° C., rapidly cooled to −100° C., and then heated to 150° C., at a rate of 20° C./minute while DSC data are collected. The glass transition temperature for the sample is measured at the midpoint of the inflection using the half-height method; cell calibration using an indium reference for temperature and enthalpy, as is known in the art. Preferably, the emulsion copolymer used in this invention has a Tg of from −40° C. to +80° C., preferably −10° C. to 35° C.

The suspension polymer particles may range in particle size from 1 micron or more, preferably 10 microns or more, and more preferably 50 microns or more, to a particle size of 10,000 microns or less, preferably 1,000 microns or less, and more preferably 500 microns or less.

The suspension (co)polymer used in the composite material preferably comprises 5 wt. % or more, or 95 wt. % or less, or 10 wt. % or more, or 90 wt. % or less of the total solids of the composite, preferably 25 wt. % or more, or 75 wt. % or less, or 25-65%, more preferably 35-65%, or up to 50 wt. %.

The aqueous suspension polymer dispersion is blended with particles of the crosslinked rubber to form a mixture in aqueous dispersion.

Further, the present inventors discovered that solid state milling techniques can be suitable in the wet milling of slurries. In one embodiment, the aqueous suspension polymer dispersion is combined with particles of the crosslinked rubber to form a mixture in aqueous dispersion, and the mixture subjected to solid-state shear pulverization ($S^3P$).

$S^3P$ is a milling method where the particle size reduction is effected by tear, shear, abrasion, or attrition and is often carried out under ambient conditions (see, for example, Chapters 2 and 3, Solid-State Shear Pulverization, K. Khait and S. Carr, Technomic Publishing Company, Inc. 2001). In addition to size reduction, $S^3P$ has been demonstrated to induce mixing or compatibilizing of multicomponent mixtures as well as mechanochemistry as a result of radicals generated from the rupture of carbon-carbon bonds. Several types of $S^3P$ processing technology and equipment have been developed since the 1970s, including the Berstorff pulverizer, Extrusion Pulverization, Rotating Grinding Mill, and Pan Mill (Polymer Engineering and Science, June 1997, Vol. 37, No. 6, 1091-1101; Plastics, Rubber and Composites Processing and Applications 1996, Vol. 25, No. 3, 152-158). Both the rotating grinding mill and the pan mill comprise a fixed surface and a rotating surface with each having different designs of the contact surfaces.

The slurry method of the present invention provides a uniform mixture of the crumb tire rubber and the suspension polymer that can be readily introduced into the mill and facilitates isolation of the product mixture of suspension polymer with crosslinked rubber or GTR after milling, even by conventional methods such as centrifugation and filtering. Suitable solid state milling techniques include those that can be used to pulverize the mixture as a slurry containing solid particulate matter, and thereby reducing the particle size of the rubber particles while they are in intimate contact with the coagulated polymer. For example, techniques such as solid state shear extrusion, SSSE, which were designed with heating units and, in normal use, used to process the input materials in the molten state, may be used with aqueous slurry mixtures under ambient conditions. Thus, a number of techniques can be used, or adapted to be used, to practice the method of this embodiment of the invention, including, but not limited to, various milling techniques, such as rotating grinding mill, high shear solid state milling, disc milling, pan milling, stone milling, plast milling; as well as other pulverizing techniques, such as the Berstorff pulverizer, extrusion pulverization, solid state shear extrusion, and Brubender Extruder; and similar techniques.

The method of the present invention further includes reducing the moisture content of the mixture. This may comprise both dewatering and drying the remaining solid composite material. Dewatering the mixture, in turn, may include such processes as, for example, filtration of the solids to remove excess water, or centrifugation, as well as further reduction of the moisture content of the sample by wringing, or pressing, or freeze-drying. Isolation of the solids also facilitates optional processing steps, such as rinsing or washing the solids. Conventional methods of drying can also be employed including, for example, the use of ovens or dryers such as vacuum dryers, air dryers, drum dryers, hand dryers or fluid bed dryers. Preferably, the method further comprises thermoplastic processing of the isolated solids, and further reduction of water content may occur during such processing, for example, by compressing the sample at temperatures above room temperature. Processing of the thermoplastic composite material, which may be carried out at elevated temperature, may include the steps of kneading or forming the composite material. Kneading may be accomplished using a two-roll mill, or by extrusion of the material, or, in some cases, at delivery to an injection molder. The forming process may include such techniques as calendering, compression molding, injection molding or extrusion. Two-roll milling is a standard polymer processing operation often used in conjunction with compression molding to transform the material into a molded article. Alternatively, extrusion or a similar melt-processing procedure can be used.

The composite material can be further crosslinked during the heated processing stage to enhance the mechanical properties and water resistance of the roof membrane. The crosslinking can be effected by the functional groups as described above (hydroxy, glycidyl, acid, amine, etc) or by incorporation of a radical generator (peroxides, peresters, azo compounds, etc) that will create reactive sites under heated conditions.

The slurry mixture may additionally comprise various additives as desired or required according to the end use of the composite material, such as, for example, one or more of vulcanizing agent, antioxidant, UV-stabilizer, fire-retardant, colorant, filler, pigment, and processing aid.

In a particularly preferred embodiment, ground tire rubber of 150 micron sieve particle size (80 mesh) is added, on an equal weight of solids basis, to a 10% solids aqueous dispersion of an acrylic suspension copolymer (weight average particle size of approximately 320 micron), and then filtered and dried before being processed in a two-roll mill and compression molded to produce the acrylic rubber composite. In order to produce flexible polymer/rubber composites, the suspension polymer should have a glass transition temperature, Tg, of less than 80° C., and preferably between −40° C. and +60° C.

The composite material produced by the process of the present invention is a thermoplastic material that can be, optionally, further formulated and compression molded to provide the desired end product, which is not limited in any particular way to one skilled in the art. In some applications, the composite material may additionally comprise fillers in the form of, for example, powders, fibers, slivers or chips; or reinforcing materials, such as non-wovens, or scrim, and the like, as known in the respective arts. Carbon Black is an example of a filler that is used in many of the end products envisioned. Useful end products include, but are not limited to, automotive parts, such as tires, bumpers, gaskets, fan belts, wiper blades, liners, vibration-dampening mounts, underbody coating, insulation and trim; building products such as roofing membranes, roofing shingles or roofing felt; modifier for EPDM roofing membrane; coatings; modifier for neoprene coatings; tiles or tile backings; carpet backings; asphalt sealer, asphalt reinforcement and asphalt concrete road surfacing material; crack filler for asphalt and cement; concrete modification; sound proofing materials; acoustic underlayment; flooring underlayment and matting; industrial products such as liners for landfill; hot melt adhesives; sports utilities such as artificial turf and track; playground surfaces; mats and pads; ball cores; and consumer products such as floor tiles; shoe soles; liners; covers; molded products; and the like.

EXAMPLES

Abbreviations:

| | |
|---|---|
| BA: | Butyl Acrylate |
| MMA: | Methyl Methacrylate |
| MAA: | Methacrylic Acid |
| LMA: | Lauryl Methacrylate |
| MHEC: | Methylhydroxyethylcellulose (Culminal ® MHEC 8000)[1] |
| Surfactant A: | Ethoxylated C8-C18 alkylether sulfate having from 1-40 ethylene oxide groups per molecule (30% active in water). |
| SLS: | Sodium Lauryl Sulfate |
| APS: | Ammonium Persulfate |
| t-BHP: | tert-Butyl Hydroperoxide |
| IAA: | Isoascorbic Acid |
| LPO: | Dilauroyl Peroxide |
| BPO: | Dibenzoyl Peroxide (75% active in water) |
| EDTA: | Ethylenediaminetetraacetate Chelating Agent |

1. Registered Trademark. (Obtained from Hercules Inc., Aqualon Division, Wilmigton, Del., USA).

Example 1

Preparation of Suspension Polymers

Aqueous polymer dispersions were prepared via suspension polymerization in a 5-liter, four-necked round bottom flask equipped with a paddle stirrer, a thermocouple, a nitrogen inlet, and a reflux condenser. In each case, the kettle contents from the suspension polymerization were rinsed with water over a 100 mesh screen and stored as a dispersion in water.

Suspension Polymer 1 (SP1): 50 BA/50 MMA 1600 g distilled water, 4.9 g MHEC, and 0.77 g Sodium Nitrite were added to the kettle. The mixture was heated to 80° C., and held at 80° C. for one hour. It was then cooled to room temperature. Meanwhile, an organic phase solution was prepared by mixing 350 g BA, 350 g MMA, 5.25 g LPO and 7 g BPO. Once the kettle contents had reached room temperature, agitation was stopped, and the organic phase was poured into the kettle. Agitation was then resumed The mixture was agitated at room temperature for ½ hour, at which point the agitation was stopped and the dispersion was checked (by eye) for stability. Agitation was then resumed. The temperature of the kettle contents was increased to 70° C. over one hour, then held at 70° C. for three hours. The temperature of the kettle contents was then increased to 80° C., held at 80° C. for one hour, then decreased to room temperature.

Generally, the kettle contents were rinsed with water over a 100 mesh screen and stored as a dispersion in water. In the case of SP1, only part of the batch was rinsed with water over a 100 mesh screen and stored as a dispersion in water. The remainder of the batch was treated as described in Example 7, below, in order to assess the effect of suspension polymer processing conditions on the properties of the polymer/rubber composite.

Suspension Polymer 2 (SP2): 75 BA/25 MMA

The procedure is the same as SP1 except the organic phase solution was prepared by mixing 525 g BA, 175 g MMA, 5.25 g LPO and 7 g BPO.

Suspension Polymer 3 (SP3): 35 LMA/33 BA/32 MMA 400 g distilled water, 2.09 g MHEC, and 0.165 g Sodium Nitrite were added to the kettle. The mixture was heated to 80° C., and held at 80° C. for one hour. It was then cooled to room temperature. Meanwhile, an organic phase solution was prepared by mixing 49.5 g BA, 52.2 g MMA, 48 g LMA, 0.75 g LPO and 1 g BPO. The remainder of the procedure is the same as SP1.

Example 2

Preparation of Emulsion Polymers

Aqueous polymer dispersions were prepared via emulsion polymerization in a 5-liter, four-necked round bottom flask equipped with a paddle stirrer, a thermocouple, a nitrogen inlet, and a reflux condenser.

Emulsion Polymer 1 (EP1A): 50 BA/49 MMA/1 MAA 500 g distilled water and 25 g Surfactant A were added to the flask. The contents were heated to 85° C. under nitrogen. Next, a solution of 5.3 g sodium bicarbonate in 20 g distilled water was added, as was a solution of 5.3 g APS in 20 g distilled water.

Once the flask contents achieved a stable temperature of 85° C., an initiator solution of 1 g APS in 120 g distilled water was fed into the kettle at a rate of 1 g/min. At the same time that the initiator feed was started a monomer emulsion (ME) (prepared from 500 g distilled water, 12.5 g Surfactant A, 750 g BA, 735 g MMA, and 15 g MAA) feed was started at 9.5 g/min for 20 minutes. After 20 minutes the ME feed was increased to 19 g/min while the initiator feed remained at 1 g/min. The kettle temperature was maintained at 85° C. Approximately 90 minutes into the polymerization, 100 g of distilled water were added slowly enough such that the temperature could be maintained at 85±3° C.

After the initiator and ME feeds were complete, the kettle temperature was held at 85° C. for 20 minutes, then decreased to 75° C. 5 g of a solution of 0.15% Iron Sulfate in distilled water was added to the kettle, as was 1.6 g of a solution of 1% EDTA in distilled water. When the temperature stabilized at 75° C., a cofeed of 0.8 g t-BHP in 20 g distilled water and 0.42 g IAA in 20 g distilled water was added to the kettle at 1/gmin. When these feeds were complete, the temperature was dropped to 65° C. When the temperature stabilized at 65° C., a cofeed of 0.8 g t-BHP in 20 g distilled water and 0.42 g IAA in 20 g distilled water was added to the kettle at 1/gmin. When these feeds were complete, the temperature was dropped to room temperature. Once the kettle temperature had dropped below 40° C., 16 g of 14.5% Ammonia in water was added to increase the pH. 4.64 g of Rocima™ BT 2S (Rohm and Haas Company, Philadelphia, Pa., USA) was dissolved in 5 g distilled water and added to the kettle, and the contents of the kettle were filtered to remove any coagulum. The resulting dispersion, EP1A, had a solids content of 50.9% and a pH of 9.17.

Emulsion Polymer 1B (EP1B): 50 BA/50 MMA

The preparation was the same as for EP1A, except the ME was prepared from 500 g distilled water, 12.5 g Surfactant A, 750 g BA and 750 g MMA. The resulting dispersion, EP1B, had a solids content of 50.4% and a pH of 9.78.

Emulsion Polymer 2 (EP2): 75 BA/24 MMA/1 MAA

The preparation was the same as for EP1A, except the ME was prepared from 500 g distilled water, 12.5 g Surfactant A, 1100 g BA, 350 g MMA and 15 g MAA. The resulting dispersion, EP2, had a solids content of 50.8% and a pH of 9.26.

Emulsion Polymer 3 (EP3): 35 LMA/32 BA/31.4 MMA/1.6 MAA

The preparation was similar to U.S. Pat. No. 5,521,266, Example 4, except EP3 used sodium lauryl sulfate as the surfactant.

TABLE 1

Composition of Suspension Polymers (susp.) and Emulsion Polymers (emul.)

| Sample | Composition | Surfactant | Tg, ° C. (by DSC[1]) |
|---|---|---|---|
| EP1A | emul. 50 BA/49 MMA/1 MAA | Surfactant A | 15 |
| EP1B | emul. 50 BA/50 MMA | Surfactant A | 15 |
| SP1 | susp. 50 BA/50 MMA | none | 38 |
| EP2 | emul. 75 BA/24 MMA/1 MAA | Surfactant A | −23 |
| SP2 | susp. 75 BA/25 MMA | none | −32 |
| EP3 | emul. 35 LMA/32 BA/31.4 MMA/1.6 MAA | SLS | −10 |
| SP3 | susp. 35 LMA/33 BA/32 MMA | none | −8 |

[1]DSC = Differential Scanning Calorimetry.

It can be seen that similar polymer compositions, prepared by the two polymerization methods, do not necessarily exhibit similar Tg. Indeed, SP1 (Tg of +38° C.) can be isolated as discrete solid beads, whereas the emulsion polymer equivalents, EP1A and EP1B (Tg of +15° C. in each case) are both film formers at room temperature (their particles coalesce).

Example 2(a)

Coagulation of Latex Polymers

The emulsion polymers of Example 2 are colloidally stable and are prepared for forming a slurry mixture with the rubber by coagulation of the latex, as follows: 1000 g of Emulsion Polymer 1 (EP1A, 50.9% solids) was diluted with 3500 g of water in a two gallon container. 37.6 g of a 40% solution of FeCl$_3$ was added to the dispersion, with stirring, to initiate the coagulation of the latex. The stirring was continued for 15 minutes and the coagulated polymer dispersion was allowed to equilibrate overnight. The particle size of the coagulated polymer solids was estimated by optical microscope to be around 10-200 microns. Additionally, the particle size and particle size distribution of the coagulated dispersion was measured using a Malvern Mastersizer 2000™ Particle Size Analyzer. The result showed a broad distribution of particles from 1 micron to 1,000 microns with >80% between 2-200 microns and with a peak at ~25 microns.

The coagulation of the latex polymer may be performed separately, or in the presence of the crosslinked rubber particles.

Example 3

Preparation of Polymer/Rubber Slurry Mixture

Colloidally stable polymer dispersions, such as the emulsion polymers of Example 2, require an extra processing step in order to prepare the polymer/rubber slurry mixture. This is because the particle size is too small to be effectively filtered in order to isolate the solids, and the latex polymer particles for the most part fail to interact with the rubber in any milling step. It has been found that both isolation of solids, and effective polymer/rubber interaction in any milling step, may be accomplished for the emulsion polymers by coagulating the latex polymer, as described in Example 2(a). Suspension polymers, on the other hand, may be used as synthesized (Example 1). Additional processing of the suspension polymer may also be performed, as discussed further in Example 7.

Polymer/rubber slurries may be prepared with minimal processing, by simply blending the coagulated latex or dispersion of suspension polymer beads with ground tire rubber, or the slurry mixture may be further processed, as described, for example, in Example 4 and/or Example 5. In the case of simple blending, the polymer dispersion (500 g of polymer solids, either as the coagulated latex or as suspension polymer beads) was blended with an equal weight (or as the desired polymer/rubber ratio dictates), solids on solids, of Ground Tire Rubber (203 micron sieve particle size; i.e. 60 mesh; from Lv Huan Rubber Powder Limited Company, Zhejiang, China), which was added gradually to the polymer dispersion, while stirring, over a 10 minute period.

Emulsion polymer/rubber composites are compared with suspension polymer/rubber composites in Example 6, below.

Example 4

Solid State Shear Pulverization (S$^3$P) of Polymer/Rubber Slurry Mixture

The slurry from Example 3 optionally may be subjected to solid state shear pulverization under wet condition using, for example, a Disk Mill (as described in U.S. Pat. No. 6,394,372) or a Pan Mill method (as described in Plastics, Rubber and Composites Processing and Applications, 1996 Vol. 25, No. 3, 152-158; Polymer Engineering and Science, 1997, Vol. 37, No. 6, 1091-1101). In each case, the polymer/rubber slurry is diluted to 10% total solids and fed into the intake of the Disk Mill or Pan Mill. The milling is carried out under ambient conditions. In the case of the Pan Mill, the slurry is milled 5 times by reintroducing the discharge of the milled slurry back into the mill, with the moving pan rotating at 60 rpm. The gap between the pans is controlled by a fluid driving device to achieve efficient pulverization of the polymer/rubber mixture. The Disk Mill rotates at much higher speeds and requires only one pass through the mill.

Example 5

Preparation of Polymer/Rubber Composite Articles

5(a) 2-Roll Milling and Compression Molding

After milling, or even without milling, the polymer/rubber slurry mixture was typically filtered using a 10 micron filter bag and the solid mixture was further wrung out to reduce the free water. Processing steps to isolate the solid composite product may vary, and some methods are described and compared below (Example 7). In a preferred procedure, the resulting moist solid (~50-60% moisture content) was dried in a vacuum oven at 70° C. (~75 cm Hg) for 2 days. The dried mixture solid (<5% moisture content) was optionally processed in a two-roll mill at 190° C. for 5 minutes before being compression molded. Compression molding was accomplished between steel plaques fitted with a 0.102, 0.127, or 0.203-cm thick (40, 50 or 80-mil thick), 25.4 cm by 25.4 cm (10 inch by 10 inch) frame at 190° C. for a total of 5 minutes: 3 minutes at low pressure (10-15 tons) and 2 minutes at high pressure (75 tons). Additional cooling was also performed under pressure (75 tons) at room temperature for 5 minutes in a cool press fitted with circulating water. Unless otherwise stated (such as, in Example 8), all of the samples prepared in the Examples below were processed on a two-roll mill and then compression molded.

5(b): Extrusion Preparation of Polymer/Rubber Composite Articles

In an alternative procedure to prepare the polymer/rubber composite articles, the dried mixture solid may be also processed by extrusion directly, without going through the two-roll milling step. The dried polymer/rubber composite may be extruded using a Haake counter-rotating conical twin screw, with two tapered 1.9 cm (¾ inch) diameter screws rotating at 40 rpm. The main unit contains three heating zones (185-190-195° C.) and various thermocouples and cooling hoses for temperature control. The material may be extruded through a 5 cm (2 inch) wide lip die with a gap size of 0.102 cm (40 mils).

Example 6

Properties of Polymer/Rubber Composite Article:
6(a) Mechanical Properties Composite samples from Example 5(a) were cut in a dogbone fashion from the molded plaques, so that a width of about 0.35 cm (0.14 inches) was obtained, and a thickness of 0.102 cm (40 mils). Mechanical testing was carried out following the ASTM D-628 protocol on a Tinius Olsen H50KS tensile tester (Tinius Olsen Inc., Horsham, Pa.), using the Type 5 setting for rubbers. The crosshead rate was 0.76 cm/min (0.3 inches/minute), and a gauge length of 0.76 cm (0.3 inches) was used. The test was run under controlled temperature of 23° C. and controlled relative humidity of 50%. From this test, the elongation at break, maximum stress (tensile strength), and tear resistance for the samples were determined. Table 2, below, compares the mechanical properties of the 50/50 polymer/rubber composites prepared using the suspension polymers and emulsion polymers of Examples 1 and 2, respectively. For a useful level of stability, emulsion polymers often require either an additional colloidal stabilizer or a small amount of an anionic monomer (for example, an acid monomer at basic pH). For this reason, the presence of 1% acid monomer in an emulsion polymer composition acts to provide a level of stability that results in a more realistic representation of the composition than the emulsion polymer without the acid monomer, but with marginal stability.

TABLE 2

Mechanical Properties of 50/50 Polymer/Rubber Composite Materials

| Sample[1] | Tensile Strength Max (psi) | Elongation at Break (%) | Tear Resistance (lbf/in) |
|---|---|---|---|
| EP1 | 523 | 419 | 138 |
| EP2 | 381 | 677 | 107 |
| SP1 | 472 | 455 | 168 |
| EP3 | 126 | 415 | 88 |
| SP2 | 79 | 464 | 42 |
| EP4 | 207 | 287 | 72 |
| SP3 | 118 | 481 | 63 |

[1]The samples were prepared by 2-roll milling followed by compression molding (Ex. 5a).

The data show that the mechanical properties vary according to the nature of the constituent polymer as opposed to the mode of conducting the polymerization. That is, there does not appear to be a significant advantage of using emulsion polymers over suspension polymers, or vice-versa, in preparing the polymer/rubber composites. Either polymer type could be used to obtain a desired property balance.

Example 6

Properties of Polymer/Rubber Composite Article:
6(b) Low Temperature Flexibility and Water Absorption Tests The flexibility of a thermoplastic composite is important in many end-use applications, such as, for example, in roofing shingles, where the composite may be in the form of a sheet that is required to flex over a roof apex. The polymer/rubber composites were tested for low temperature flexibility according to the Mandrel Bend Test (ASTM test D552), which measures the resistance to cracking of rubber-type materials. The polymer/rubber membrane (0.102 cm thickness, or 40 mil) was bent over a cylindrical mandrel of specified diameter (1.3 cm, or ½ inch), and at a specified low temperature (−25° C. and −45° C.) for a 1 second time period and evaluated for cracking. If cracking has not occurred, the procedure is repeated using a smaller diameter mandrel (0.3 cm, or ⅛ inch). The test is evaluated on a "pass" (P)/"fail" (F) basis according to whether cracking occurs at a given mandrel diameter and at the given temperature (Table 3, below; "P ½" means the membrane did not crack after bending over a ½ inch diameter mandrel at the test temperature indicated).

Many industrial applications of polymeric materials or composites, such as roofing applications, require minimal water absorption, for example less than 5% water absorption upon soaking in water over a period of 7 days, or less than 10% over a period of 20 days, or as the application may dictate. The water sensitivity of the final solid composite materials, after compression molding, was determined by soaking a piece of the molded composite in water and then, after drying off the surface water, measuring the water absorption over time. The water absorption was calculated as the weight % of water absorbed relative to the weight of the composite (Table 3, below).

TABLE 3

Low Temperature Flexibility and Water Absorption Properties of 50/50 Polymer/Rubber Composite Materials

| Sample[1] | Low Temp Flex (−25° C.) | Low Temp Flex (−45° C.) | Water Absorption, % (7 Days) | Water Absorption, % (28 Days) |
|---|---|---|---|---|
| EP1 | F ½ | — | 12.5 | 43.7 |
| EP2 | F ½ | — | 6.6 | 20 |
| SP1 | P ½, P ⅛ | — | 4.5 | 9.7 |
| EP3 | P ½ | F ½ | 10.7 | 35 |
| SP2 | P ½, P ⅛ | P ½ | 5.6 | 8.4 |
| EP4 | P ½ | P ½ | 5.5 | 12.3 |
| SP3 | P ½, P ⅛ | P ½ | 4.5 | 6.6 |

[1]The samples were prepared by 2-roll milling followed by compression molding (Ex. 5a).

The data show that the low temperature flexibility of the polymer/rubber composites is enhanced for the composites prepared from suspension polymers compared to that for the composites prepared from emulsion polymers, the difference being more significant for the higher Tg polymers. Furthermore, the water sensitivity of the polymer/rubber composite prepared from suspension polymers is much reduced compared to that for the composites prepared from emulsion polymers.

Additionally, the suspension polymers provide composites with superior melt processing properties; specifically, it was noticed that the polymer/rubber composites from suspension polymers had better fuse[1] and banding[2], bank roll formation[3], melt strength[4], cross-cut[5] and fold[5] compared to composites from similar emulsion polymers.

1. Fusion: The material forms a coherent mass during processing. The powder particles completely fuse together. A material with better fusion will do this more quickly than one with poor fusion.
2. Banding: The material fuses into a coherent ribbon around the roll, which can be easily removed without sticking to the mill. This ribbon has enough mechanical integrity to be easily removed and manipulated.
3. Bank Roll Formation: A cylinder of material forms on the top of the 2 roll mill, in between the two rolls. This material rotates as the rolls rotate. Bank roll formation is important because it imparts homogeneity to the product, both in terms of allowing the different components to completely mix before going through the mill, as well as ensuring the thickness of the ribbon going through the mill is uniform.
4. Melt Strength: A tensile property of the melt, such that the melt strength can be qualitatively gauged by pulling on the sheet coming out of the two roll mill. A sample with a higher melt strength will stretch and then rebound. A sample with very low melt strength will simply flow.
5. Cross-cut and fold: The sheet coming out of the two-roll mill can be cut, folded, and re-fed through the mill.

Example 7

Effect of Suspension Polymer Processing on Polymer/Rubber Composite Properties

Samples of the 50/50 suspension polymer/rubber slurry mixture (from Example 3) were used to make polymer composites via four different methods of processing the suspension polymer (SP1). The methods consisted of:

i) Control: SP1 Washed: The procedure for preparing the suspension polymer is the same as described above for SP1. Part of the batch was rinsed with water over a 100 mesh screen and stored as a dispersion in water. The rinsed suspension polymer and GTR were mixed at the desired polymer/rubber ratio (by weight solids), and squeezed in a filter bag. The rinse and squeeze cycle was performed 3 times in the filter bag. The wet cake was dried in a vacuum oven (60° C., ~75 cm Hg) overnight. This is the control procedure (washed).

The remainder of the batch (unwashed) was treated as follows:

ii) SP1, Unwashed: This portion was removed from the kettle at the end of polymerization and stored without washing. The suspension polymer and GTR were mixed at the desired polymer/rubber ratio (by weight solids), and squeezed in a filter bag once without any additional rinsing. The wet cake was dried in a vacuum oven (60° C., ~75 cm Hg) overnight.

iii) SP1, Washed and Dried before mixing: This portion was washed with water over a 100 mesh screen. The polymer particles were then dried under ambient conditions to produce a sandy powder. The dried suspension polymer and GTR were mixed at the desired polymer/rubber ratio. The mixture was further dried in a vacuum oven (60° C., ~75 cm Hg) overnight.

iv) SP1, treated with cellulase: Part of the SP1 batch (after rinsing with water) was mixed for three hours with cellulase (1.5% based on weight of polymer solids). It was then rinsed with water over a 100 mesh screen and stored as a dispersion in water. The rinsed suspension polymer and GTR were mixed at the desired polymer/rubber ratio (by weight solids), and squeezed in a filter bag. The rinse and squeeze cycle was performed 3 times in the filter bag. The wet cake was dried in a vacuum oven (60° C., ~75 cm Hg) overnight.

The polymer/rubber composites were otherwise prepared identically. Each of the samples was two-roll milled and then compression molded as described in Example 5(a). Mechanical properties were tested for the polymer composites formed by the four different methods (below, Table 4).

TABLE 4

Effect of Suspension Polymer Processing on Mechanical Properties of 50/50 Polymer/Rubber Composite Materials[1]

| Processing Mode | Tensile Strength (psi) | Elongation at Break (%) | Tear Resistance (lbf/in.) |
|---|---|---|---|
| Control (Washed) | 508 | 377 | 190 |
| Unwashed | 481 | 350 | 188 |
| Washed and Dried | 474 | 333 | 177 |
| Cellulase Treated | 444 | 313 | 182 |

[1]All used 50/50 Polymer/Rubber Composites derived from Suspension Polymer, SP1.

The data show that the various suspension polymer processing conditions do not greatly affect the mechanical properties of the polymer/rubber composites for composites made from suspension polymers.

Additionally, the water absorption properties after (7 days and after 28 days) for the polymer/rubber composites obtained from the four different methods were almost identical to each other. The particulars of the processing mode of the suspension polymer do not appear to have a significant effect on the properties of the composites for a given composite composition, indicating that the systems are quite robust in terms of ease of manufacture.

Example 8

Effect of Polymer/Rubber Processing on Polymer/Rubber Composite Properties

TABLE 5

Effect of Polymer/Rubber Processing on Mechanical Properties of 35/65 Polymer/Rubber Composite Materials[1]

| Sample | Processing Mode | Tensile Strength (psi) | Elongation at Break (%) | Tear Resistance (lbf/in.) |
|---|---|---|---|---|
| SP1 | 2-roll mill only | 248 | 87 | 88 |
| SP1 | Molded[2] | 347 | 129 | 118 |
| SP2 | 2-roll mill only | 49 | 415 | 34 |
| SP2 | Molded[2] | 58 | 357 | 40 |

[1]All used 35/65 ratio polymer/rubber composites derived from suspension polymer, SP1.
[2]2-roll milled and then compression molded.

Generally speaking, it appears that compression molding may be effective in optimizing mechanical properties of the polymer/rubber composites.

TABLE 6

Effect of Polymer/Rubber Processing on Low Temperature Flexibility and Water Absorption[1] Properties of 35/65 Polymer/Rubber Composite Materials[2]

| Sample | Processing Mode | Low Temp Flex (−25° C.) | Low Temp Flex (−45° C.) | Water Absorption (7 Days) | Water Absorption (28 Days) |
|---|---|---|---|---|---|
| SP1 | 2-roll mill | P ½ | F ½ | 15 | 39 |
| SP1 | Molded[2] | P ½ | P ½ | 7 | 12 |
| SP2 | 2-roll mill | P ½ | P ½ | 16 | 36 |
| SP2 | Molded[2] | P ½ | P ½ | 9 | 18 |

[1]Water swelling by ASTM D471, soak time = 7 days at 120° F.
[2]All used 35/65 ratio polymer/rubber composites derived from suspension polymer SP1.
[3]2-roll milled and then compression molded.

The data show that the additional compression molding process step results in improved low temperature flexibility and significantly improved water absorption properties.

Example 9

Effect of Polymer/Rubber Ratio on Polymer/Rubber Composite Properties

TABLE 7

Effect of Polymer/Rubber Ratio on Mechanical Properties of Polymer/Rubber Composite Materials Using an Emulsion Polymer[1]

| Polymer/Rubber Ratio | Tensile Strength Max (psi) | Elongation at Break (%) | Tear Resistance (lbf/in) |
|---|---|---|---|
| 10/90 | 306 | 168 | 95 |
| 25/75 | 415 | 199 | 99 |
| 34/66 | 470 | 200 | 116 |
| 50/50 | 681 | 377 | 172 |
| 66/34 | 712 | 294 | 230 |
| 75/25 | 1027 | 477 | 259 |

TABLE 7-continued

Effect of Polymer/Rubber Ratio on Mechanical Properties of Polymer/Rubber Composite Materials Using an Emulsion Polymer[1]

| Polymer/Rubber Ratio | Tensile Strength Max (psi) | Elongation at Break (%) | Tear Resistance (lbf/in) |
|---|---|---|---|

[1]For each sample the polymer/rubber composite comprises an emulsion polymer (Rhoplex ™ AC-261, Rohm and Haas Company, Philadelphia, PA) of composition 52.9 BA/46.1 MMA/1.0 MAA and rubber provided as ground tire rubber of 60 mesh particle size. The samples were prepared by 2-roll milling and compression molding (Ex. 5(a)).

The mechanical properties of the composite are strongly dependent on the polymer/rubber ratio, showing both increased strength and elongation with increasing emulsion polymer content.

TABLE 8

Effect of Polymer/Rubber Ratio on Mechanical Properties of Polymer/Rubber Composite Materials Using a Suspension Polymer[1]

| Polymer/Rubber Ratio | Tensile Strength Max (psi) | Elongation at Break (%) | Tear Resistance (lbf/in) |
|---|---|---|---|
| 10/90 | 181 | 116 | 55 |
| 20/80 | 241 | 162 | 75 |
| 35/65 | 248 | 87 | 88 |
| 50/50 | 508 | 377 | 190 |
| 65/35 | 745 | 487 | 238 |

[1]For each sample the polymer/rubber composite comprises a suspension polymer of composition 50 BA/50 MMA (SP1) and rubber provided as ground tire rubber of 60 mesh particle size. The samples were prepared by 2-roll milling and compression molding (Ex. 5(a)).

The mechanical properties of the composite are strongly dependent on the polymer/rubber ratio, showing both increased strength and elongation with increasing suspension polymer content.

Example 10

Composite Materials Prepared from Suspension Polymers of Varying Polymer Composition The composite materials can be prepared with a range of other suspension polymers including acrylic polymers; styrene-acrylic polymers; vinyl-acrylic polymers, vinylacetate polymers, vinylacetate-acrylic polymers, ethylene-vinylacetate polymers, ethylene-vinylacetate-vinylchloride polymers, and synthetic rubber, such as isoprenes, butadienes such as styrene-butadiene polymers, and styrene-butadiene-acrylonitrile polymers. The polymer/rubber slurry mixtures are prepared for each suspension polymer according to the method as described in Example 3. These polymer/rubber slurries are further processed by the methods described in Examples 4 and 5 to produce composite materials.

Example 11

Composite Materials Prepared from Waste Material from Industrial Suspension Polymer Manufacturing Facility Polymer/rubber slurry mixtures may be prepared by the method of Example 3 using the waste material derived from a suspension polymer manufacturing facility. The waste material may be used to prepare a polymer/rubber slurry by blending with GTR (for example, 203 micron sieve particle size; i.e. 60 mesh), added at a similar solids level, and then milling and processing the polymer/rubber mixture as described above. The resulting composite sheet derived from the waste suspension polymers and GTR, after compression molding, is expected to have similar integrity as that in Example 6.

We claim:
1. A method of making a composite material comprising:
   (a) providing, by suspension polymerization, one or more aqueous polymer dispersion of at least one suspension polymer with glass transition temperature, Tg, of no more than 80° C. as measured by differential scanning calorimetry, DSC;
   (b) combining particles of one or more crosslinked rubber, having particle size of from about 10 micron sieve particle size to about 11,100 micron sieve particle size, with the aqueous polymer dispersion of suspension polymer to form an aqueous dispersion mixture in aqueous dispersion;
   (c) reducing the moisture content of the aqueous dispersion mixture;
   (d) forming an article.
2. The method of claim 1 further comprising subjecting the aqueous dispersion mixture, either before or after reducing the moisture content of the aqueous dispersion mixture, to solid state shear pulverization.
3. The method of claim 1 further comprising one or more processing step, chosen from kneading the mixture, 2-roll milling the mixture, compression molding the mixture, and extruding the mixture in forming the article.
4. The method of claim 1 wherein the particle size of the crosslinked rubber ranges from 35 micron sieve particle size (400 mesh) to 2,500 micron sieve particle size (8 mesh).
5. The method of claim 2 wherein the particle size of the crosslinked rubber ranges from 43 micron sieve particle size (325 mesh) to 11,100 micron sieve particle size (2 mesh).
6. The method of claim 4 wherein the crosslinked rubber is obtained, at least in part, from recycled rubber.
7. The method of claim 4 wherein the crosslinked rubber is obtained, at least in part, from recycled tires.
8. The method of claim 1 or claim 2 wherein reducing the moisture content of the mixture comprises isolating the solid content of the mixture.
9. The method of claim 2 wherein the solid state shear pulverization comprises pan milling or disk milling.
10. The method of claim 1 wherein the suspension polymer comprises a copolymer having polymerized units of one or more functional monomers with functionality chosen from carboxy acid functionality, phosphorus acid functionality, hydroxy functionality, amine functionality, acetoacetoxy functionality, silyl functionality, epoxy functionality, cyano functionality, isocyanate functionality, and combinations thereof.
11. The method of claim 3 wherein the composite material is further crosslinked during the one or more processing step chosen from kneading the mixture, 2-roll milling the mixture, compression molding the mixture, or extruding the mixture.
12. A method of making a composite material comprising:
   (a) providing, by suspension polymerization, one or more aqueous polymer dispersion of at least one suspension polymer with glass transition temperature, Tg, of no more than 80° C. as measured by differential scanning calorimetry, DSC;
   (b) drying the aqueous polymer dispersion of the suspension polymer to produce suspension polymer with moisture content of less than 10%;
   (c) combining particles of one or more crosslinked rubber, having particle size of from about 10 micron sieve particle size to about 11,100 micron sieve particle size, with the suspension polymer with moisture content of less than 10%;
   (d) forming an article.

* * * * *